United States Patent
Hirokawa et al.

(10) Patent No.: US 10,439,473 B2
(45) Date of Patent: Oct. 8, 2019

(54) ELECTRIC MOTOR-ATTACHED SPEED REDUCER

(71) Applicant: Nidec Corporation, Kyoto (JP)

(72) Inventors: Tsuyoshi Hirokawa, Kyoto (JP); Kosuke Mizuike, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 226 days.

(21) Appl. No.: 15/421,643

(22) Filed: Feb. 1, 2017

(65) Prior Publication Data
US 2017/0237315 A1    Aug. 17, 2017

(30) Foreign Application Priority Data

Feb. 12, 2016 (JP) .................. 2016-024536

(51) Int. Cl.
| | |
|---|---|
| *H02K 7/14* | (2006.01) |
| *H02K 7/00* | (2006.01) |
| *H02K 7/08* | (2006.01) |
| *F16H 49/00* | (2006.01) |
| *H02K 41/06* | (2006.01) |
| *H02K 7/116* | (2006.01) |

(52) U.S. Cl.
CPC ............. *H02K 7/14* (2013.01); *F16H 49/001* (2013.01); *H02K 7/003* (2013.01); *H02K 7/08* (2013.01); *H02K 7/116* (2013.01); *H02K 41/06* (2013.01)

(58) Field of Classification Search
CPC ........ F16H 49/001; H02K 7/14; H02K 7/003; H02K 7/08; H02K 7/116; H02K 41/06
USPC .............................. 310/77, 83, 99
See application file for complete search history.

(56) References Cited

U.S. PATENT DOCUMENTS

| | | | | |
|---|---|---|---|---|
| 2007/0039414 A1* | 2/2007 | Takemura | ............... | H02K 41/06 74/640 |
| 2007/0214644 A1* | 9/2007 | Kanai | ................... | F16C 19/362 29/893.37 |

(Continued)

FOREIGN PATENT DOCUMENTS

| | | | | |
|---|---|---|---|---|
| JP | 60-166259 U | 11/1985 | | |
| JP | 2016-029877 A | 3/2016 | | |
| JP | 2016029877 A | * 3/2016 | ............. | H02K 7/116 |

OTHER PUBLICATIONS

Machine translation of JP-2016029877-A. (Year: 2016).*

*Primary Examiner* — Michael Andrews
(74) *Attorney, Agent, or Firm* — Keating & Bennett, LLP

(57) ABSTRACT

An electric motor-attached speed reducer includes a first member, an electric motor, a speed reduction mechanism, and a second member. The electric motor is arranged to produce rotational motion with respect to the first member. The speed reduction mechanism is arranged to transfer the rotational motion obtained from the electric motor while reducing the speed thereof. The second member is arranged to rotate relative to the first member at a rotation rate resulting from the speed reduction. A first bearing is arranged between the first and second members. A second bearing is arranged between the first member and a rotor of the electric motor. The speed reduction mechanism includes a flexible third bearing arranged between a non-perfect circular cam and a flexible external gear. The second bearing is arranged to radially overlap with a rotor holder at a first axial position. The third bearing is arranged to radially overlap with the rotor holder at a second axial position different from the first axial position.

8 Claims, 2 Drawing Sheets

(56) References Cited

U.S. PATENT DOCUMENTS

| | | | |
|---|---|---|---|
| 2011/0245006 A1 | 10/2011 | Negishi | |
| 2011/0314950 A1* | 12/2011 | Mamba | H02K 7/1163 74/490.05 |
| 2013/0004348 A1 | 1/2013 | Sugiyama et al. | |
| 2015/0107388 A1* | 4/2015 | Yajima | F16H 57/023 74/412 R |

* cited by examiner

ELECTRIC MOTOR-ATTACHED SPEED REDUCER

CROSS REFERENCE TO RELATED APPLICATIONS

This application claims the benefit of priority to Japanese Patent Application No. 2016-024536 filed on Feb. 12, 2016. The entire contents of this application are hereby incorporated herein by reference.

BACKGROUND OF THE INVENTION

1. Field of the Invention

The present invention relates to an electric motor-attached speed reducer.

2. Description of the Related Art

An electric motor-attached speed reducer which includes an electric motor and a speed reducer and which outputs power obtained from the electric motor while reducing the speed thereof has been known. In particular, in recent years, there has been an increasing demand for electric motor-attached speed reducers which are slim, having a small axial dimension, and which are applied to a joint portion of a work robot or a powered exoskeleton, a turntable, a wheel-in index plate, or the like.

In order to achieve a reduction in the axial dimension of an electric motor-attached speed reducer, it is conceivable to, for example, dispose an electric motor around a rotation axis and arrange a speed reduction mechanism radially outside of an outer circumference of the electric motor such that the electric motor and the speed reduction mechanism are concentric with each other. The electric motor and the speed reduction mechanism are thus arranged at the same axial position, resulting in a reduction in the axial dimension of the electric motor-attached speed reducer as a whole. A known electric motor-attached speed reducer in which a speed reduction mechanism is arranged radially outside of an outer circumference of an electric motor is described in, for example, JP-UM-A 60-166259.

JP-UM-A 60-166259 illustrates a configuration in which a wave generator that serves as a speed reducer is arranged radially outside of an outer-rotor motor. In this configuration, an unbalanced load is applied from the wave generator to a rotor yoke of the motor. That is, a radial load applied from the wave generator to the rotor yoke varies while the motor is running. However, in the configuration described in JP-UM-A 60-166259, the rotor yoke of the motor is supported by only one bearing of the wave generator. Accordingly, unwanted deformation and deflection may easily occur in the rotor yoke while the motor is running.

SUMMARY OF THE INVENTION

An electric motor-attached speed reducer according to a preferred embodiment of the present invention includes a first member; an electric motor arranged to produce rotational motion with respect to the first member; a speed reduction mechanism arranged to transfer the rotational motion obtained from the electric motor while reducing a speed thereof; a second member arranged to rotate relative to the first member at a rotation rate resulting from the speed reduction; a first bearing arranged to support the first and second members such that the first and second members are rotatable relative to each other; and a second bearing arranged to support the first member and a rotor of the electric motor such that the first member and the rotor are rotatable relative to each other. The rotor includes a rotor magnet, and a rotor holder arranged to hold the rotor magnet. The speed reduction mechanism includes a non-perfect circular cam including an outer circumferential surface being at different distances from a rotation axis of the electric motor at different circumferential positions; a flexible external gear arranged to be deformed in accordance with rotation of the non-perfect circular cam; a third bearing being flexible and arranged between the non-perfect circular cam and the flexible external gear; and an internal gear arranged in the second member. The flexible external gear and the internal gear are arranged to have different numbers of teeth, mesh with each other, and rotate relative to each other because of the different numbers of teeth. The second bearing is arranged to radially overlap with the rotor holder at a first axial position. The third bearing is arranged to radially overlap with the rotor holder at a second axial position different from the first axial position.

According to the above preferred embodiment of the present invention, the rotor holder can be supported by the second bearing to reduce deformation and deflection transferred from the third bearing to the rotor holder. Deformation and deflection of the rotor holder caused by an unbalanced load can thus be minimized. This contributes to stabilizing an operation of the speed reduction mechanism.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, a preferred embodiment of the present invention will be described with reference to the accompanying drawings. It is assumed herein that a direction parallel to a rotation axis of an electric motor is referred to by the term "axial direction", "axial", or "axially", that directions perpendicular to the rotation axis are referred to by the term "radial direction", "radial", or "radially", and that a direction along a circular arc centered on the rotation axis is referred to by the term "circumferential direction", "circumferential", or "circumferentially". Note that it is assumed that the term "parallel" as used above includes "substantially parallel". Also note that it is assumed that the term "perpendicular" as used above includes "substantially perpendicular".

It is also assumed herein that the axial direction is a vertical direction, and that a side on which a second member is arranged with respect to a first member is an upper side, and the shape of each member or portion and relative positions of different members or portions will be described based on the above assumption. It should be noted, however, that the above definitions of the vertical direction and the upper side are not meant to restrict in any way the orientation of an electric motor-attached speed reducer according to any preferred embodiment of the present invention when in use.

Figure 1:
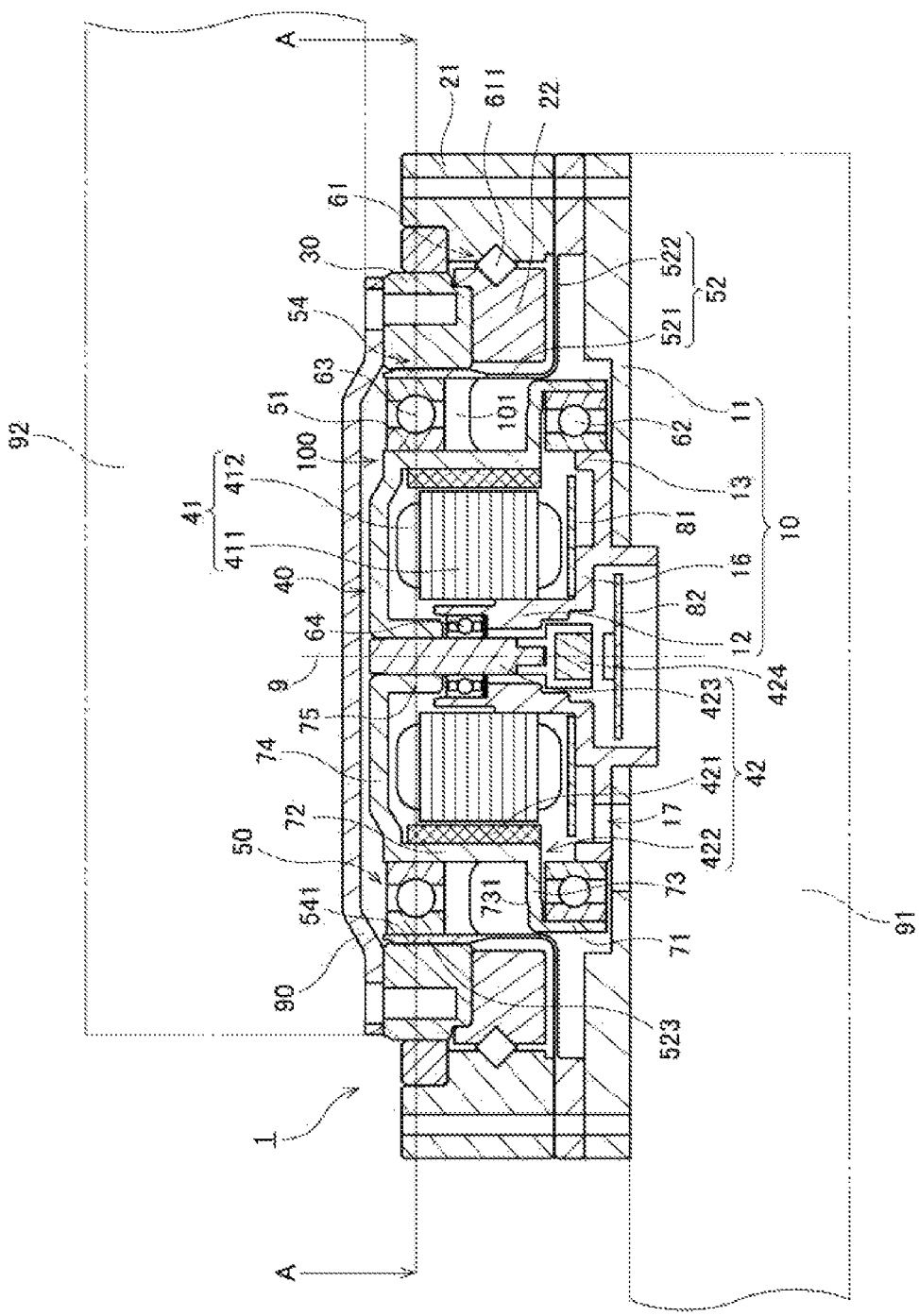
FIG. 1 is a vertical sectional view of an electric motor-attached speed reducer according to a preferred embodiment of the present invention.
Figure 2:
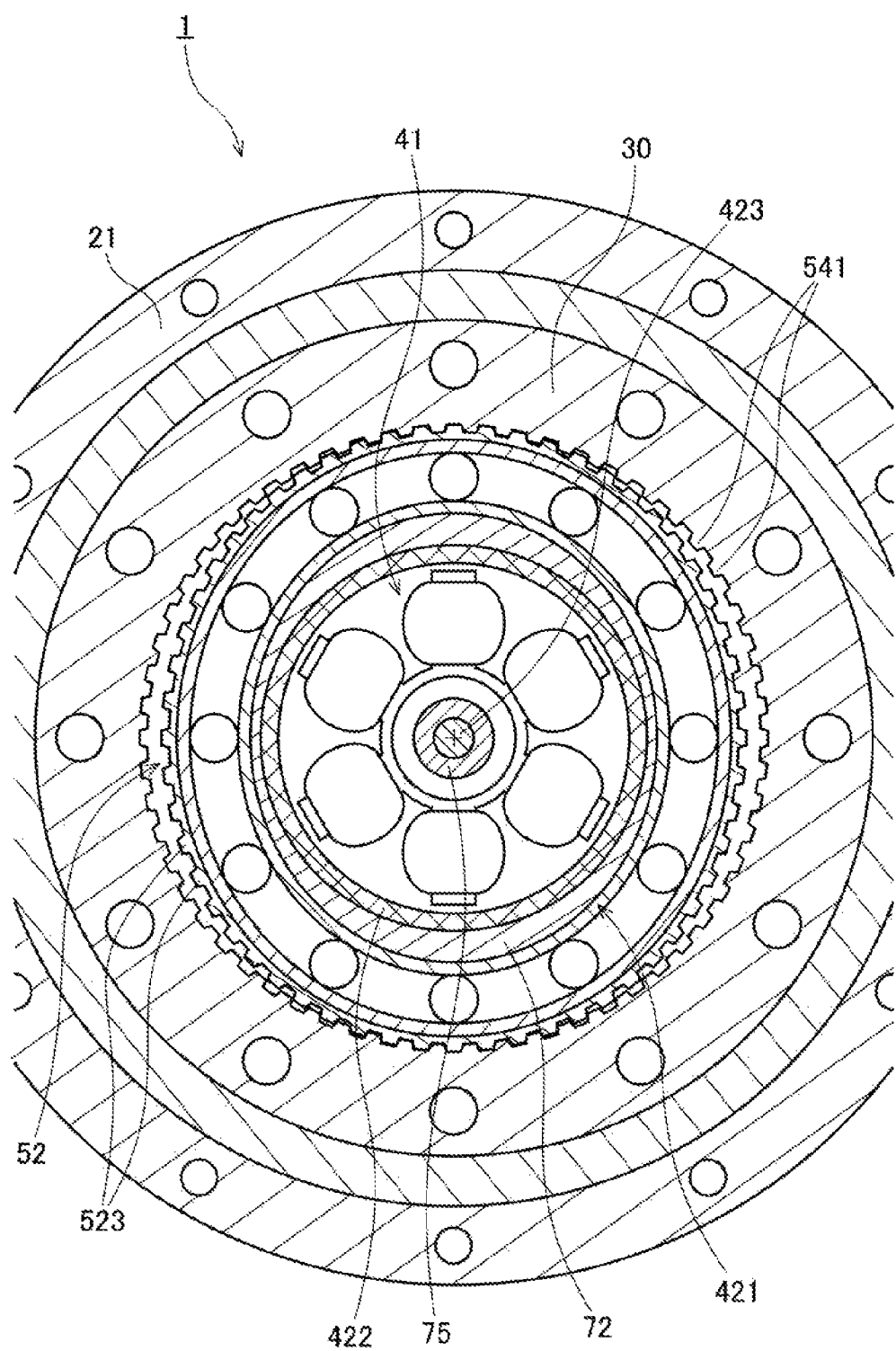
FIG. 2 is a horizontal sectional view of the electric motor-attached speed reducer.

FIG. 1 is a vertical sectional view of an electric motor-attached speed reducer 1 according to a first preferred embodiment of the present invention. FIG. 2 is a horizontal sectional view of the electric motor-attached speed reducer 1 taken along line A-A in FIG. 1. The electric motor-attached speed reducer 1 is arranged to cause a first member 10 and a second member 30 to rotate relative to each other while converting rotational motion at a first rotation rate obtained from an electric motor 40 to rotational motion at a second rotation rate lower than the first rotation rate. More specifically, the second member 30 is caused to rotate relative to the first member 10 at the rotation rate resulting from the speed reduction.

The electric motor-attached speed reducer 1 is, for example, installed in a joint portion of an arm of a work robot to realize bending and stretching of the arm. Note that electric motor-attached speed reducers according to other preferred embodiments of the present invention may be installed in other devices, such as, for example, a powered exoskeleton, a turntable, an index plate of a machine tool, a wheelchair, and an automated guided vehicle, to realize various types of rotational motion.

Referring to FIGS. 1 and 2, the electric motor-attached speed reducer 1 according to the present preferred embodiment includes the first member 10, the electric motor 40, a speed reduction mechanism 50, the second member 30, a first bearing 61, and a second bearing 62. In more detail, the electric motor-attached speed reducer 1 includes the first member 10, an outer ring 21, an inner ring 22, the second member 30, the electric motor 40, the speed reduction mechanism 50, a circuit board 81, a detector 82, and a cover member 90. The electric motor-attached speed reducer 1 includes four bearings, i.e., the first bearing 61, the second bearing 62, a third bearing 63, and a fourth bearing 64.

The first member 10 is a metal member arranged to support various portions of the electric motor-attached speed reducer 1 directly or indirectly. Note that the first member 10 may alternatively be made of a resin. The first member 10 is, for example, fixed to an arm member 91, which is a base-side one of two arm members 91 and 92 that together form the arm of the work robot, through screwing. As illustrated in FIG. 1, the first member 10 according to the present preferred embodiment is defined by two members. Note that the first member 10 may alternatively be defined by a single monolithic member.

The first member 10 according to the present preferred embodiment includes a base portion 11, a stator holding portion 12, a bearing holding portion 13, and a board support portion 16. The base portion 11 is arranged to be perpendicular to a rotation axis 9 of the electric motor 40, and is in the shape of a plate and in the shape of a circular ring. The base portion 11 of the first member 10 is arranged to extend perpendicularly to the axial direction. The board support portion 16 is arranged radially inside of the base portion 11. An upper surface of the board support portion 16 is arranged at a level higher than that of an upper surface of the base portion 11. The stator holding portion 12 is arranged to extend upward from a radially inner end portion of the board support portion 16 to assume the shape of a cylinder. The stator holding portion 12 is arranged radially inside of a stator 41, which will be described below. The bearing holding portion 13 is arranged radially outward of both the stator holding portion 12 and the board support portion 16. In addition, the bearing holding portion 13 is arranged to extend upward from the base portion 11 to assume the shape of a cylinder. Each of the stator holding portion 12 and the bearing holding portion 13 is arranged to be coaxial with the rotation axis 9.

The outer ring 21 is a cylindrical member fixed to the first member 10. The outer ring 21 is in the shape of a circular ring, and is arranged most radially outward in the electric motor-attached speed reducer 1 to enclose the speed reduction mechanism 50. In addition, the outer ring 21 is arranged to be coaxial with the rotation axis 9.

The second member 30 is a member in the shape of a circular ring and arranged radially inside of the outer ring 21. The second member 30 is, for example, fixed to the arm member 92, which is a tip-side one of the two arm members 91 and 92 that together form the arm of the work robot, through screwing. As illustrated in FIG. 2, an inner circumferential surface of the second member 30 includes a plurality of internal teeth 541 arranged with a constant pitch in the circumferential direction.

The inner ring 22 is a cylindrical member fixed to the second member 30. The inner ring 22 is arranged below the second member 30 and radially inside of the outer ring 21. The inner ring 22 is arranged to be coaxial with the rotation axis 9.

The first bearing 61 is arranged between the outer ring 21 and the inner ring 22. In the present preferred embodiment, a cross-roller bearing is used as the first bearing 61. As illustrated in FIG. 1, the first bearing 61 includes a plurality of cylindrical rollers 611 arranged between an inner circumferential surface of the outer ring 21 and an outer circumferential surface of the inner ring 22. The cylindrical rollers 611 are arranged in alternate orientations between an annular V groove defined in the inner circumferential surface of the outer ring 21 and an annular V groove defined in the outer circumferential surface of the inner ring 22. The outer ring 21 and the inner ring 22 are thus connected while permitting rotation relative to each other.

The aforementioned cross-roller bearing is able to provide necessary rigidity in both the axial and radial directions without being used in a pair, unlike ball bearings. Accordingly, the need to provide a plurality of bearings is eliminated, which leads to a reduction in the number of bearings.

In the present preferred embodiment, a portion of the outer ring 21 which includes the inner circumferential surface thereof serves as an outer race of the first bearing 61. Note, however, that the first bearing 61 may alternatively include an outer race separate from the outer ring 21. In addition, in the present preferred embodiment, a portion of the inner ring 22 which includes the outer circumferential surface thereof serves as an inner race of the first bearing 61. Note, however, that the first bearing 61 may alternatively include an inner race separate from the inner ring 22.

The first bearing 61 is arranged to support the first and second members 10 and 30 such that the first and second members 10 and 30 are rotatable relative to each other. In the present preferred embodiment, a combination of the first member 10 and the outer ring 21 and a combination of the second member 30 and the inner ring 22 are supported by the first bearing 61 to be rotatable relative to each other. Note, however, that the outer ring 21 may alternatively be provided as a portion of the first member 10, and the first bearing 61 may be arranged between the first member 10 and one of the inner ring 22 and the second member 30. Also note that the inner ring 22 may alternatively be provided as a portion of the second member 30, and the first bearing 61 may be arranged between the second member 30 and the outer ring 21.

The electric motor 40 is a driving source that produces rotational motion in accordance with electric drive currents. That is, the electric motor 40 is arranged to produce rotational motion with respect to the first member 10. The electric motor 40 includes the stator 41 and a rotor 42. The stator 41 is arranged to be stationary relative to the first member 10. The rotor 42 is supported to be rotatable with respect to the first member 10.

The stator 41 is arranged radially inside of a rotor magnet 421, which will be described below. The stator 41 includes an annular stator core 411 including a plurality of salient pole portions, and coils 412 each of which is wound around a separate one of the salient pole portions. The salient pole portions are arranged to extend radially outward. An inner circumferential surface of the stator core 411 is fixed to an outer circumferential surface of the stator holding portion 12 through, for example, press fitting, an adhesive, crimping, welding, or the like. In the present preferred embodiment, the stator 41 is thus directly fixed to the first member 10. This leads to a reduction in the number of parts of the electric motor 40. Note, however, that another member may alternatively be arranged between the first member 10 and the stator 41.

The rotor 42 includes the rotor magnet 421, a rotor holder 422, and a shaft 423. The rotor magnet 421 is a magnet in the shape of a circular ring and arranged radially outside of the stator 41. An inner circumferential surface of the rotor magnet 421 is arranged radially opposite to an outer end surface of each of the salient pole portions of the stator core 411 with a slight gap therebetween. In addition, the inner circumferential surface of the rotor magnet 421 includes north and south poles arranged to alternate with each other in the circumferential direction. In the present preferred embodiment, the rotor holder 422 and the shaft 423 are defined by separate members. Note that the rotor holder 422 and the shaft 423 may alternatively be defined by the same member, for example. In this case, the rotor holder 422 and the shaft 423 are produced in one piece by a cutting process.

Note that, in place of the magnet in the shape of a circular ring, a plurality of magnets may alternatively be used as the rotor magnet 421. In the case where the plurality of magnets are used, the magnets are arranged in the circumferential direction such that north and south poles alternate with each other.

The rotor holder 422 is a cup-shaped member arranged to hold the rotor magnet 421. That is, the rotor 42 includes the rotor magnet 421 and the rotor holder 422 arranged to hold the rotor magnet 421. Iron, which is a magnetic material, for example, is used as a material of the rotor holder 422. The rotor holder 422 according to the present preferred embodiment includes a first holder portion 71, a second holder portion 72, an annular plate portion 73, a top plate portion 74, and an inner cylindrical portion 75.

The first holder portion 71 is cylindrical. The first holder portion 71 is arranged radially outside of the second bearing 62. In more detail, the first holder portion 71 is arranged to extend in the axial direction radially outside of the second bearing 62. The second holder portion 72 is cylindrical, and is arranged to extend in the axial direction above and radially inward of the first holder portion 71. That is, the second holder portion 72 is cylindrical, and is smaller in distance from the rotation axis 9 than the first holder portion 71. In more detail, the radial distance between an inner circumferential surface of the second holder portion 72 and the rotation axis 9 is smaller than the radial distance between an inner circumferential surface of the first holder portion 71 and the rotation axis 9. The second holder portion 72 is arranged radially outside of the rotor magnet 421. The rotor magnet 421 is fixed to the inner circumferential surface of the second holder portion 72 through, for example, an adhesive.

The first holder portion 71 includes a cylindrical outer circumferential surface centered on the rotation axis 9. The second holder portion 72 includes an outer circumference which is elliptical and is centered on the rotation axis 9 when viewed in the axial direction. An outer circumferential surface of the second holder portion 72 defines an elliptical cam 51, which will be described below.

The annular plate portion 73 is arranged to extend radially between an upper end portion of the first holder portion 71 and a lower end portion of the second holder portion 72. The first holder portion 71 is joined to the second holder portion 72 through the annular plate portion 73. That is, the annular plate portion 73 is arranged to extend radially to join the first and second holder portions 71 and 72 to each other. The top plate portion 74 is arranged to extend radially inward from an upper end portion of the second holder portion 72. The top plate portion 74 is arranged to extend in a circular ring above the stator 41. The inner cylindrical portion 75 is cylindrical, and is arranged to extend downward from a radially inner end portion of the top plate portion 74.

The second bearing 62 is arranged between the first member 10 and the rotor holder 422. In the present preferred embodiment, a ball bearing is used as the second bearing 62. An inner race of the second bearing 62 is fixed to an outer circumferential surface of the bearing holding portion 13. An outer race of the second bearing 62 is fixed to the inner circumferential surface of the first holder portion 71 of the rotor holder 422. In addition, a plurality of balls are arranged between the inner and outer races of the second bearing 62.

The annular plate portion 73 includes a shoulder portion 731. Specifically, referring to FIG. 1, the annular plate portion 73 includes the shoulder portion 731, which is in the shape of a circular ring. A portion of a lower surface of the annular plate portion 73 which is radially inside of the shoulder portion 731 is arranged at a level higher than that of a portion of the lower surface of the annular plate portion 73 which is radially outside of the shoulder portion 731. The portion of the lower surface of the annular plate portion 73 which is radially outside of the shoulder portion 731 is arranged to be in contact with the outer race of the second bearing 62. Meanwhile, the portion of the lower surface of the annular plate portion 73 which is radially inside of the shoulder portion 731 is arranged to be out of contact with the inner race of the second bearing 62. Thus, provision of the shoulder portion 731 causes only the outer race, out of the inner and outer races of the second bearing 62, to be in contact with the annular plate portion 73.

Note that the shoulder portion 731 is defined at least in the lower surface of the annular plate portion 73, out of an upper surface and the lower surface of the annular plate portion 73. For example, the shoulder portion 731 may be defined only in the lower surface of the annular plate portion 73 by a cutting process. Also note that a member such as, for example, a washer may alternatively be arranged between the annular plate portion and the outer race of the second bearing 62 without the shoulder portion 731 being defined in the annular plate portion 73. Also note that the outer race of the second bearing 62 may be press fitted to the inner circumferential surface of the first holder portion 71, and be thus fixed to the rotor holder 422.

The second bearing 62 is arranged to support the first member 10 and the rotor 42 of the electric motor 40 such that the first member 10 and the rotor 42 are rotatable relative to each other. In the present preferred embodiment, the first member 10 and the rotor holder 422 are supported by the second bearing 62 to be rotatable relative to each other. Note, however, that the second bearing 62 may alternatively be arranged between the rotor holder 422 and another member fixed to the first member 10. Also note that the second bearing 62 may alternatively be arranged between the first member 10 and another member fixed to the rotor holder 422. Also note that the second bearing 62 may alternatively be arranged between another member fixed to the first member 10 and another member fixed to the rotor holder 422.

Also note that, instead of the ball bearing, a bearing of another type, such as, for example, a roller bearing, a cross-roller bearing, or a plain bearing, may alternatively be used as the second bearing 62.

The shaft 423 is a columnar member arranged to extend along the rotation axis 9. An upper end portion of the shaft 423 is press fitted inside the inner cylindrical portion 75 of the rotor holder 422. The fourth bearing 64 is arranged between the shaft 423 and the stator holding portion 12. A ball bearing, for example, is used as the fourth bearing 64. The shaft 423 and the stator holding portion 12 are supported by the fourth bearing 64 to be rotatable relative to each other.

Once electric drive currents are supplied to the coils 412, magnetic flux is generated around each coil 412. Then, action of magnetic flux between the salient pole portions and the rotor magnet 421 produces a circumferential torque, so that the rotor magnet 421, the rotor holder 422, and the shaft 423 are caused to rotate about the rotation axis 9 at the first rotation rate. In the present preferred embodiment, a brushless DC motor, which is suitable for driving the arm of the work robot, is used as the electric motor 40. Note, however, that electric motors used in other preferred embodiments of the present invention may not necessarily be brushless DC motors.

The speed reduction mechanism 50 is a mechanism to transfer the rotational motion obtained from the electric motor while reducing the speed thereof. So-called strain wave gearing, which utilizes a flexible gear, is used as the speed reduction mechanism 50 of the electric motor-attached speed reducer 1. As illustrated in FIGS. 1 and 2, the speed reduction mechanism 50 includes the elliptical cam 51, a flexible external gear 52, an internal gear 54, and the third bearing 63. Note that the elliptical cam 51 may alternatively be replaced with a non-perfect circular cam having another shape and not being at a constant distance from the rotation axis 9. The non-perfect circular cam includes an outer circumferential surface being at different distances from the rotation axis 9 at different circumferential positions.

In the present preferred embodiment, an outer circumferential portion of the second holder portion 72 defines the elliptical cam 51. That is, the rotor holder 422 and the elliptical cam 51 are defined by the same member. The outer circumference of the second holder portion 72 is elliptical when viewed in the axial direction. That is, the radial distance between the outer circumferential surface of the second holder portion 72 and the rotation axis 9 differs at different circumferential positions. The rotor holder 422 and the elliptical cam 51 being defined by the same member as described above leads to a reduction in the number of parts of the electric motor-attached speed reducer 1. Note, however, that the rotor holder 422 and the elliptical cam 51 may alternatively be defined by separate members. For example, with the outer circumference of the second holder portion 72 being alternatively arranged to be perfectly circular when viewed in the axial direction, a separate elliptical cam 51 having an elliptical outer circumference when viewed in the axial direction may be attached to the second holder portion 72.

The internal gear 54 is arranged in the second member 30. In the present preferred embodiment, an inner circumferential portion of the second member 30 defines the internal gear 54. In the inner circumferential surface of the second member 30, the plurality of internal teeth 541 are arranged with a constant pitch in the circumferential direction. The second member 30 and the internal gear 54 being defined by the same member as described above leads to a reduction in the number of parts of the electric motor-attached speed reducer 1. Note, however, that the second member 30 and the internal gear 54 may alternatively be defined by separate members. For example, with an inner circumference of the second member 30 being arranged to be perfectly circular when viewed in the axial direction, a separate internal gear 54 having a plurality of internal teeth 541 may alternatively be attached to the second member 30.

The flexible external gear 52 is a flexible ring-shaped gear. The flexible external gear 52 is arranged to be deformed in accordance with rotation of the elliptical cam 51. As illustrated in FIG. 1, the flexible external gear 52 according to the present preferred embodiment includes a tubular portion 521 and a flange portion 522. The tubular portion 521 is tubular, and is arranged to extend in the axial direction. In an outer circumferential surface of the tubular portion 521, a plurality of external teeth 523 are arranged with a constant pitch. The flange portion 522 is arranged to extend radially outward from the tubular portion 521. In more detail, the flange portion 522 is arranged to extend radially outward from a lower end portion of the tubular portion 521. The flange portion 522 is fixed to the first member 10. In more detail, a radially outer end portion of the flange portion 522 is held and fixed between the first member 10 and the outer ring 21. The flexible external gear 52 can thus be axially positioned without the need for a separate positioning member.

The third bearing 63 is arranged between the elliptical cam 51 and the tubular portion 521 of the flexible external gear 52. An inner race of the third bearing 63 is flexible, and is fixed along an outer circumferential surface of the elliptical cam 51, the outer circumference of which is elliptical when viewed in the axial direction. That is, the third bearing 63 is flexible, and is arranged between the elliptical cam 51 and the flexible external gear 52. An outer race of the third bearing 63 is fixed to an inner circumferential surface of the flexible external gear 52, and is deformed together with the tubular portion 521. In addition, a plurality of balls are arranged between the inner and outer races of the third bearing 63. Note that the inner race of the third bearing 63 may alternatively be, for example, integrally defined with the elliptical cam 51 and be defined by the same member as the elliptical cam 51. In this case, the inner race of the third bearing 63 is rigid.

Once the elliptical cam 51 starts rotating together with the rotor holder 422, the shape of the tubular portion 521 changes in accordance with the rotation of the elliptical cam 51. That is, when viewed in the axial direction, the tubular portion 521 comes into the shape of an ellipse in accordance with the shape of the outer circumferential surface of the elliptical cam 51, and a major axis of the ellipse rotates, following the rotation of the elliptical cam 51. Out of the plurality of external teeth 523 defined in the outer circumferential surface of the tubular portion 521, only those external teeth 523 which are positioned at both ends of the major axis mesh with the internal teeth 541 of the internal gear 54.

The number of internal teeth 541 of the internal gear is different from the number of external teeth 523 of the tubular portion 521. Accordingly, every time the elliptical cam completes a single rotation, the position of the internal tooth 541 that meshes with the external tooth 523 at the same position in the flexible external gear 52 shifts. Thus, the flexible external gear 52 and the internal gear 54 mesh with each other and rotate relative to each other because of the difference in the number of teeth. Accordingly, the second member 30 slowly rotates about the rotation axis 9 relative to the first member 10. As a result, the arm member 92 on the tip side slowly rotates relative to the arm member 91 on the base side. The rotation rate of this relative rotation is the second rotation rate lower than the first rotation rate.

Note that the outer circumference of the second holder portion 72 may not necessarily be elliptical when viewed in the axial direction. It is sufficient if the outer circumference of the second holder portion 72 as viewed in the axial direction is non-perfect circular so that the radial distance between the rotation axis 9 and the outer circumference of the second holder portion 72 differs at different circumferential positions. That is, in place of the elliptical cam 51, a non-perfect circular cam having another shape and not being at a constant distance from the rotation axis 9 may alternatively be used.

The circuit board 81 is a board on which an electrical circuit to control driving of the electric motor 40 is mounted. In the present preferred embodiment, the circuit board 81 is attached to the upper surface of the board support portion 16. Each of the coils 412 and the detector 82, which will be described below, is electrically connected to the circuit board 81. While the electric motor-attached speed reducer 1 is running, the electric drive currents are supplied from the circuit board 81 to the coils 412 on the basis of detection signals obtained from the detector 82. The electric motor 40 is thus driven.

As illustrated in FIG. 1, the first member 10 according to the present preferred embodiment includes a through hole 17. The through hole 17 is arranged to pass through the base portion 11 in the axial direction. A conducting wire extending from an external power supply is passed through the through hole 17 to be connected to the circuit board 81.

The detector 82 is a sensor to detect the rotational position or the rotation rate of the second member 30 with respect to the first member 10. A magnetic sensor is used as the detector 82 according to the present preferred embodiment. The detector 82 is arranged below the board support portion 16 and radially inside of the base portion 11. A sensor magnet 424 is arranged at a lower end surface of the shaft 423. The detector is arranged to sense changes in magnetism of the sensor magnet 424 caused by rotation of the shaft 423, and thus detect the rotational position or the rotation rate of the shaft 423. Note that a pulse-counting rotary encoder that utilizes a reflective optical sensor, for example, may alternatively be used as the detector 82. In the case where the rotary encoder is used, the detector 82 optically senses an object to be sensed which is defined by, for example, a striped pattern or recesses and projections arranged in the circumferential direction to detect the rotational position or the rotation rate of the rotor 42.

A Hall element to detect the position of the rotor magnet 421 is mounted on the circuit board 81.

The cover member 90 is a disk-shaped member arranged to cover upper sides of the electric motor 40 and the speed reduction mechanism 50. The cover member 90 is arranged to extend perpendicularly to the rotation axis 9. A peripheral portion of the cover member 90 is fixed to the second member 30. That is, the electric motor-attached speed reducer 1 includes the cover member 90 arranged to extend perpendicularly to the axial direction, and fixed to the second member 30. In addition, the cover member 90 is arranged axially opposite to both the rotor holder 422 and the third bearing 63. In more detail, a lower surface of the cover member 90 is arranged axially opposite to both the top plate portion 74 of the rotor holder 422 and the third bearing 63. The electric motor-attached speed reducer 1 further includes a grease 101. More specifically, the grease 101 is arranged between the cover member 90, the rotor holder 422, and the third bearing 63. In more detail, when the electric motor-attached speed reducer 1 is used, the grease 101 is arranged in a space 100 between the rotor holder 422, the third bearing 63, and the cover member 90. Thus, the space between the cover member 90, the rotor holder 422, and the third bearing 63 can be employed to hold the grease 101. Moreover, heat generated in the electric motor 40 can thus be discharged to an outside through the rotor holder 422, the grease 101, and the cover member 90.

Each of the flexible external gear 52, the internal gear 54, and the third bearing 63 is lubricated by the grease 101 supplied from the space 100. In addition, heat generated in the electric motor 40 or the speed reduction mechanism 50 is transferred from the top plate portion 74 of the rotor holder 422 to the cover member 90 through the space 100 in which the grease 101 is arranged. The heat transferred is then discharged to the outside through an upper surface of the cover member 90. Heat of the electric motor 40 can thus be efficiently discharged to the outside.

As described above, the speed reduction mechanism 50 of the electric motor-attached speed reducer 1 is the strain wave gearing. Therefore, while the speed reduction mechanism 50 is in operation, an unbalanced load is applied from the third bearing 63 to the rotor holder 422. That is, a radial pressure applied to the rotor holder 422 varies.

However, according to the configuration of the present preferred embodiment, the second bearing 62 is arranged to radially overlap with the first holder portion 71 at a first axial position. In addition, the third bearing 63 is arranged to radially overlap with the second holder portion 72 at a second axial position different from the first axial position. That is, the second bearing 62 is arranged to radially overlap with the rotor holder 422 at the first axial position, while the third bearing 63 is arranged to radially overlap with the rotor holder 422 at the second axial position different from the first axial position. Accordingly, support of the rotor holder 422 by the second bearing 62 can reduce deformation and deflection transferred from the third bearing 63 to the rotor holder 422. Therefore, deformation and deflection of the rotor holder 422 caused by the unbalanced load can be minimized. This contributes to stabilizing the operation of the speed reduction mechanism 50.

In addition, according to the configuration of the present preferred embodiment, the second bearing 62 is arranged at a level lower than both that of the shaft 423 and that of the stator core 411. This allows an increase in the size of a space in which the stator 41 is arranged around the shaft 423. This in turn allows an increase in the size of the stator 41, which leads to an increase in output of the electric motor 40.

In particular, according to the configuration of the present preferred embodiment, at least a portion of the second bearing 62 and at least a portion of the third bearing 63 are arranged axially opposite to each other. A reduction in the radial dimension of the electric motor-attached speed reducer 1 can thus be achieved when compared to the case where the second and third bearings 62 and 63 are arranged at different radial positions.

In addition, according to the configuration of the present preferred embodiment, the second holder portion 72 is arranged radially inside of the third bearing 63. Further, the rotor holder 422 includes, below the second holder portion 72, the annular plate portion 73 extending radially outward therefrom, and the cylindrical first holder portion 71 extending downward from an outer end of the annular plate portion 73. Furthermore, the second holder portion 72 is arranged radially outside of the rotor magnet 421. Accordingly, the grease 101 supplied to a vicinity of the third bearing 63 does not easily enter into a space inside of the rotor holder 422. This leads to a reduction in the likelihood that the grease 101 will make contact with the stator 41, the circuit board 81, or any other part housed in the space inside of the rotor holder 422 and in which an electric current is passed.

In addition, according to the configuration of the present preferred embodiment, the through hole 17 defined in the base portion 11 is arranged radially inward of the first holder portion 71. Further, a portion of the second bearing 62 is arranged to axially overlap with the through hole 17. That is, the through hole 17 is arranged to open toward the space inside of the rotor holder 422, into which the grease 101 does not easily enter. Thus, the grease 101 supplied to the vicinity of the third bearing 63 can be prevented from leaking out through the through hole 17.

In addition, according to the configuration of the present preferred embodiment, the flange portion 522 of the flexible external gear 52 is arranged to extend radially outward from the lower end portion of the tubular portion 521. The tubular portion 521 is arranged to extend in the axial direction so as to span a range between the first and second axial positions. That is, the flange portion 522 is arranged to extend radially outward from an end portion of the tubular portion 521 on the side closer to the first axial position. The third bearing 63 is arranged to support an end portion of the tubular portion 521 on the side closer to the second axial position. Thus, there is no need to provide a space for fixing the flange portion 522 near an upper end of the flexible external gear 52. This leads to a further reduction in the axial dimension of the electric motor-attached speed reducer 1. In addition, the third bearing 63 is arranged to support an upper end portion of the tubular portion 521, where a radial displacement occurs most easily in the tubular portion 521. This leads to an increase in stability with which the tubular portion 521 of the flexible external gear 52 is deformed.

While preferred embodiments of the present invention have been described above, it will be understood that the present invention is not limited to the above-described preferred embodiments.

Note that each member that appears in each of the above-described preferred embodiments may be defined by a plurality of members. As a material of each member, a high-strength metal, for example, may be used. Note, however, that the material of each member may not necessarily be a metal as long as the material can withstand a load during use.

Note that the shape of details of the electric motor-attached speed reducer may be different from the shape thereof as illustrated in the accompanying drawings of the present application.

Preferred embodiments of the present invention are applicable to, for example, electric motor-attached speed reducers.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric motor-attached speed reducer comprising:
   a first member;
   an electric motor arranged to produce rotational motion with respect to the first member;
   a speed reduction mechanism arranged to transfer the rotational motion obtained from the electric motor while reducing a speed thereof;
   a second member arranged to rotate relative to the first member at a rotation rate resulting from the speed reduction;
   a first bearing arranged to support the first and second members such that the first and second members are rotatable relative to each other;
   a second bearing arranged to support the first member and a rotor of the electric motor such that the first member and the rotor are rotatable relative to each other, the rotor including a rotor magnet, and a rotor holder arranged to hold the rotor magnet; and
   a grease; wherein
   the speed reduction mechanism includes:
      a non-perfect circular cam including an outer circumferential surface being at different distances from a rotation axis of the electric motor at different circumferential positions;
      a flexible external gear arranged to be deformed in accordance with rotation of the non-perfect circular cam;
      a third bearing being flexible and arranged between the non-perfect circular cam and the flexible external gear; and
      an internal gear arranged in the second member;
   the flexible external gear and the internal gear are arranged to have different numbers of teeth, mesh with each other, and rotate relative to each other because of the different numbers of teeth;
   the second bearing is arranged to radially overlap with the rotor holder at a first axial position;
   the third bearing is arranged to radially overlap with the rotor holder at a second axial position different from the first axial position;
   at least a portion of the second bearing and at least a portion of the third bearing are arranged axially opposite to each other;
   the rotor holder includes:
      a first holder portion being cylindrical;
      a second holder portion being cylindrical and smaller in distance from the rotation axis than the first holder portion; and
      an annular plate portion arranged to extend radially to join the first and second holder portions to each other;
      the first holder portion is arranged radially outside of the second bearing; and
      the second holder portion is arranged radially outside of the rotor magnet and radially inside of the third bearing.

2. The electric motor-attached speed reducer according to claim 1, wherein the flexible external gear includes:
a tubular portion arranged to extend in an axial direction; and
a flange portion arranged to extend radially outward from the tubular portion; and
the flange portion is fixed to the first member.

3. The electric motor-attached speed reducer according to claim 2, wherein
the tubular portion is arranged to extend in the axial direction so as to span a range between the first and second axial positions;
the flange portion is arranged to extend radially outward from an end portion of the tubular portion on a side closer to the first axial position; and
the third bearing is arranged to support an end portion of the tubular portion on a side closer to the second axial position.

4. The electric motor-attached speed reducer according to claim 1, wherein the first bearing is a cross-roller bearing.

5. The electric motor-attached speed reducer according to claim 1, wherein the rotor holder and the non-perfect circular cam are defined by a same member.

6. The electric motor-attached speed reducer according to claim 1, wherein the annular plate portion includes a shoulder portion.

7. The electric motor-attached speed reducer according to claim 1, wherein
the first member includes:
a base portion arranged to extend perpendicularly to the axial direction; and
a through hole arranged to pass through the base portion in the axial direction; and
a portion of the second bearing is arranged to axially overlap with the through hole.

8. The electric motor-attached speed reducer according to claim 1, further comprising a cover member arranged to extend perpendicularly to the axial direction, and fixed to the second member, wherein
the cover member is arranged axially opposite to both the rotor holder and the third bearing; and
the grease is arranged between the cover member, the rotor holder, and the third bearing.

* * * * *